Patented Dec. 28, 1943

2,337,890

UNITED STATES PATENT OFFICE 2,337,890

OIL-MODIFIED PHENOLIC CONDENSATION PRODUCT AND METHOD OF MAKING THE SAME

Herman I. Hersh, Scotia, N. Y., assignor to General Electric Company, a corporation of New York No Drawing. Application April 12, 1940, Serial No. 329,345

2 Claims. (Cl. 260—19)

This invention relates to oil-modified phenolic condensation products and to methods of making these products. The invention is especially concerned with thermosetting phenolic condensation products of high oil content, which products can be transformed by the application of heat into a hard, tough, thoroughly cured state either in the form of thin films or as thick, cast or impregnated articles.

Phenolic resins modified with oil, e. g., tung oil, linseed oil, castor oil, and the like are well known. Usually the phenolic body employed in the preparation of these compositions is a cresol, xylenol or other substituted phenol, the aldehyde condensation product of which is inherently more or less oil-soluble. Resinous compositions of this type that are characterized by a high oil content, that is, those containing 60 per cent or more of oil, exhibit many of the characteristics of the particular oil employed and are in general limited to the manufacture of varnish, thin layers of which harden by oxidation with or without the application of heat. On the other hand, the low oil content products, that is, products containing less than about 30 per cent by weight of oil, exhibit the heat-hardenable characteristics of their major constituent, namely the phenolic resin, and can be used in the formation of impregnated or cast articles wherein the hardening process is not dependent primarily upon oxidation. In such products, the oil, such as castor oil or China-wood oil, may function primarily as a plasticizer or softener.

I have now found that heat-curable or heat-hardenable oil-modified phenolic resins of higher oil content than the previously known heat-hardenable oil-modified phenolic resins may be obtained by suitably reacting a phenolic body, an aldehyde and an oil comprising a triglyceride of a keto-acid, specifically oiticica oil. The products of my invention are inexpensive, are adapted for making coating compositions when combined with suitable oils or solvents, and because of their good electrical and mechanical properties, are particularly useful as impregnating or binding agents in the manufacture of electrical coils, laminated products and the like.

In carrying out my invention, I prepare a phenol-aldehyde-oil condensation product utilizing any phenolic body, e. g., phenol ($C_6H_5OH$) and substituted phenols capable of forming a resin upon reaction with an aldehyde, e. g., the cresols, the xylenols, etc. Such substituted phenols are more fully described in the copending application of Gaetano F. D'Alelio, Serial No. 319,515, filed February 15, 1940, and assigned to the same assignee as the present invention.

Although I have tried numerous oils of both animal and vegetable origin, a keto-acid oil, such as oiticica oil, is the only type found which, even when present in the phenolic composition in an amount as high as 55 per cent by weight, nevertheless will produce a heat-hardenable product. The oiticica oil product is particularly useful when the oil is incorporated in amounts ranging from 35 to 55 per cent by weight of the total final resinous composition. Because of their comparatively high oil content, as compared with ordinary laminating resins, the resinous products are less expensive to prepare in so far as raw materials are concerned and can be cooked to the final cure in a shorter time than that ordinarily required for other oil-modified resins including those in which the oil content is considerably less than 35 per cent of the oil resin composition. Further, varnish films containing the high oil content resin are characterized by an outstanding lack of brittleness, an increased flexibility, and an increased age resistance.

As will be shown more fully hereinafter, the oiticica oil, unlike other drying and semi-drying oils previously used, apparently chemically reacts with the resin-forming ingredients so readily that even with the products of higher oil content, it is possible to substitute as much as 65 per cent castor oil for part of the oiticica oil without markedly decreasing the heat-hardenable characteristics of the final products. In this respect the castor oil in itself appears to be unique in so far as the possible substitution of a second oil for part of the oiticica oil is concerned. Of the many oils I have tried for this purpose, including such oils as soya, linseed, China-wood, and dehydrated castor oil, ordinary castor oil is the only one which can be substituted for as much as 65 per cent of the oiticica oil without substantial loss of the heat-hardenable characteristics and toughness of the oiticica oil-modified compositions. This property of oiticica oil which permits the addition of castor oil in such large amounts is even more surprising when it is realized that castor oil is probably one of the least desirable oils when used alone as a modifier for phenolic condensation products, particularly when the oil content exceeds that at which the castor oil functions merely as a plasticizer or softener.

I ordinarily prefer to use monoamylamine as a catalyst in the preparation of resins embodying my invention as this particular amine apparently gives a faster cook or cure than other organic amines, such as triethanolamine, diethyleneamine or the like, which amines can, however, be used with or without the addition of ammonia when the final product is to be used in the manufacture of electrical equipment such as coils or the like. In some instances, as when phenol is used as a starting material, ordinary inorganic alkaline materials, such as the alkali hydroxides or carbonates, may be used if the electrical properties of the final product are of secondary consideration.

In order that those skilled in the art might better understand how my invention may be carried into effect, the following specific examples are given:

*Example I*

|  | Parts by weight |
|---|---|
| Oiticica oil | 46.3 |
| Paraformaldehyde | 9.0 |
| Formalin (37.5%) | 3.0 |
| Cresol | 41.1 |
| Monoamylamine | 0.6 |

All of the above ingredients are weighed into an iron kettle and the latter is heated over a low fire slowly at 100° to 110° C. The mass is held at this temperature during the entire process of cooking to the end point which is determined by testing a small pill of the material on a hot plate. The requisite end point is a 20 to 25 second cure at 200° C. when the oil content of the resin is around 50 per cent as is the case with the subject formula. Ordinarily about two hours' cooking of the mass is required to reach this point. At this time the mass is removed from the fire and cut as soon as possible with a suitable solvent such as mineral spirits.

In the above formula, the cresol composition used comprises a mixture of hydrocarbon substituted phenols having an average molecular weight of 120. It may be desirable in certain instances to react the formaldehyde and oil together in the presence of the catalyst for a short time before adding the required amount of phenol or phenolic body. Preferably from 0.8 to 1.1 mols formaldehyde are used for each mol of the phenolic constituent.

The resin produced by the above process is amber in color and in the cured state shows no cracks, holes or pits. It easily can be through-cured and the product so obtained possesses a smooth, shiny surface. Films of the material are exceptionally tough. The curing time and hardness of the phenolic oil varnish prepared as above are superior to the corresponding oil-modified phenolic bodies containing much smaller amounts of China-wood oil. If desired, from 2 to 3 per cent of hexamethylenetetramine may be dissolved in the phenol varnish for the purpose of decreasing the curing time and increasing the hardness. Also, a small amount of cresol may be added to inhibit shelf-aging and slow down the curing rate.

In the above example the final product after removal of water, etc., is one containing about 40 per cent oil. The following example pertains to a condensation product in which the oil component is a 50–50 mixture of castor oil and oiticica oil, the oil mixture forming about 40 per cent of the dehydrated final product:

*Example II*

|  | Parts by weight |
|---|---|
| Oiticica oil | 19.0 |
| Castor oil | 19.0 |
| Paraformaldehyde | 11.0 |
| Formalin (37.5%) | 3.7 |
| Cresol | 46.8 |
| Monoamylamine | 0.5 |

The cooking schedule for this composition is substantially that given in the previous example except that with the lower oil content resins the cooking process is ordinarily stopped when a small pill of the material cures in from 15 to 20 seconds on a hot plate held at 200° C.

The content of oiticica oil or a mixture of oiticica oil and castor oil may be correspondingly increased or decreased in either of the above formulas to obtain a higher or lower oil length product. As the rate of reaction apparently decreases with increasing oil content, it may be desirable in preparing a resin containing about 55 per cent by weight of oil to substitute paraformaldehyde for all or part of the formalin solution. Ordinarily, some formalin is used in the preparation of the lower oil content varnishes primarily for the purpose of decreasing the rate of reaction and thus permitting a better control of the cooking process.

In the preparation of resins using phenol as one of the reactants, it is usually desirable to employ an inorganic material, such as sodium hydroxide, as the catalyst. For example, a clear heat-hardenable resin having a cure of 15 seconds on the hot plate may be prepared by heating a mixture of formaldehyde, phenol and about 40 per cent by weight of oiticica oil for two hours in the presence of a small amount of sodium hydroxide. Similar results are obtained with increased oiticica oil content. Such results cannot be obtained using similar mixtures containing China-wood oil instead of oiticica oil. Upon heating, such China-wood oil mixtures will become cloudy and separate into two non-compatible layers consisting respectively of phenolic resin and oil. On the other hand, the oiticica oil mixtures remain clear throughout the entire cooking time to give clear, quick-curing, final products. These differences in the behavior of the China-wood oil and oiticica oil-modified resins, seem to indicate that, unlike other oils, the oiticica oil chemically reacts with the phenolic resin component.

Suitable driers, such as lead, manganese and cobalt compounds, may be employed although ordinarily such additions are not necessary. Solutions of the finished resin show no substantial change in viscosity over long periods of time. In the hardened state my product exhibits good electrical and mechanical properties. Hence, it is a desirable impregnating or bonding medium for electrical coils, laminated insulating materials or the like.

As the varnishes prepared from the oiticica oil-modified products are characterized by lower viscosities than the corresponding China-wood oil resin varnishes, useful coating and impregnating compositions of higher base content may readily be prepared from the oiticica oil compositions. In fact, because the cooked resins described herein are themselves characterized by comparatively low viscosities, they may be used without the addition of any solvent as so-called "solventless varnishes." In such cases the base content of the product may be said to be 100 per cent. It is sometimes desirable in the preparation of the resins intended for use as solventless varnishes to cook the mixtures of the phenolic body and oil with slightly less than the normal amount of formaldehyde so that the reaction taking place at about 110° C. may be stopped at the desired point without the addition of mineral spirits or the like. After the mass has cooled to about 50-60° C., the rest of the formaldehyde is added. The product is ideally suited for use wherever the presence of a fugitive solvent is undesirable.

The distinguishing characteristics or properties of the oiticica oil-modified phenolic condensation products are perhaps best described by comparing these products with oil-modified condensation products containing equivalent amounts of China-wood oil.

Three compositions, each containing different modifying oils, are prepared from mixtures of cresol, formaldehyde and 50 per cent by weight of the particular oil in the presence of an amine catalyst. These compositions respectively contain the specified amounts of oiticica oil, a 50-50 mixture of oiticica oil and castor oil, and China-wood oil, but otherwise are identical both as to ingredients and proportions. When equal amounts of the three compositions are placed in a test tube and held at 150° C., the resin modified with oiticica oil is found to gel after a total elapsed time of 30 minutes, the resin containing the 50-50 mixture of oiticica and castor oils after a total elapsed time of 180 minutes, while that containing 50 per cent China-wood oil shows no sign of gelling within 600 minutes although a thin hard film forms on the surface of the mass probably due to the oxidation of the China-wood oil.

When layers of the three compositions one-quarter inch thick are cured at a temperature of 125° C. for two hours, hard non-tacky products are obtained in the case of the oiticica oil and castor-oiticica oil modified resins whereas the China-wood oil product containing the same amount of oil is still in a stringy condition at the end of this time. Corresponding tests on samples of the oil-modified resins having a 40 per cent oil length show even greater differences between the through-curing rates of the various compositions.

As previously stated, the cooking process is usually discontinued when a small ball of the mass cures within from 10 to 25 seconds on a hot plate held at 200° C. In the case of a 50 per cent oil-modified resin, the total elapsed time for cooking the oiticica oil-modified and the combination oiticica-castor oil-modified resins is approximately 120 minutes. The corresponding China-wood oil product, after 120 minutes' cook shows a curing rate of approximately 60 seconds.

The comparison of drying times at 150° C. of oiticica oil-modified and China-wood oil-modified resins of 50 per cent oil length shows that the oiticica oil-modified resin dries within 10 minutes or, in other words, at about the same length of time necessary for the hardening of an unmodified phenol-aldehyde condensation product, whereas the China-wood oil product requires some 50 minutes to reach the same degree of dryness.

As previously stated, compositions of my invention may be used as coatings when dissolved in suitable solvents, such as mineral spirits, or may be used in the preparation of laminated materials or for the impregnation of electrical coils. When used as impregnants for coil structures, the wound coil of suitably insulated wire is impregnated with the described resin either in solution or as a solventless varnish, and is then baked until the resinous material is transformed into a hard binder. As the baked product is heat-resistant and does not flow at the operating temperatures of the coil, the individual strands are permanently bonded together. The particular advantage derived from the use of my resin as a coil impregnant is that even though the compositions contain a considerable quantity of modifying oil, oxidation apparently is not required in the hardening of the product during baking. Hence, whereas a coil impregnated with a corresponding China-wood oil-modified resin and thereafter baked will have a hard exterior but a comparatively soft uncured interior, coil treated with my resin is uniformly hard throughout. Furthermore, this condition can be obtained in about one-third of the baking time and at lower temperatures than are required for the China-wood oil products.

A particularly desirable coil, from the standpoint of cost and compactness, may be obtained by use of insulated copper wire, the insulation of which comprises the heat treated reaction product of an aldehyde with a hydrolyzed polymerized vinyl acetate. After winding the insulated wire on a spool, which may be formed of paper laminations bonded by my resinous compositions, and securing the winding with a suitable fabric tape, the assembly is impregnated with the oiticica oil-modified phenolic varnish with or without the application of pressure. The impregnated coil is then baked for two or three hours at 150° C. to produce a finished coil in which the resinous binder is thoroughly cured throughout the coil to a hard non-tacky state.

What I claim as new and desire to secure by Letters Patent of the United States is:

1. The method of making a heat-hardenable resinous composition which comprises heat reacting, in the presence of monoamylamine, a mixture of ingredients consisting of (1) a cresol composition consisting of a mixture of hydrocarbon-substituted phenols having an average molecular weight of 120, (2) formaldehyde, and (3) an oil component consisting of a 50-50 mixture of castor oil and oiticica oil, the said oil component being present in an amount corresponding to from 35 to 55 per cent of the dehydrated resinous product, and continuing said reaction until the resinous product has a cure point of from 15 to 25 seconds on a hot plate held at 200° C.

2. A heat-hardenable resinous composition which is the heat-reaction product of a mixture of ingredients consisting of (1) a cresol composition consisting of a mixture of hydrocarbon-substituted phenols having an average molecular weight of about 120, (2) formaldehyde, and (3) an oil mixture consisting of about 50 per cent castor oil and 50 per cent oiticica oil, in the presence of monoamylamine, the said oil mixture being present in an amount corresponding to from 35 to 55 per cent of the dehydrated resinous heat-reaction product.

HERMAN I. HERSH.